(12) United States Patent
Taguchi (10) Patent No.: US 12,227,183 B2
(45) Date of Patent: Feb. 18, 2025

(54) TRAVELING CONTROL APPARATUS (71) Applicant: SUBARU CORPORATION, Tokyo (JP)

(72) Inventor: Noriaki Taguchi, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 225 days.

(21) Appl. No.: 17/947,831

(22) Filed: Sep. 19, 2022

(65) Prior Publication Data

US 2023/0099932 A1 Mar. 30, 2023

(30) Foreign Application Priority Data

Sep. 29, 2021 (JP) ................. 2021-159667

(51) Int. Cl.
*B60W 30/165* (2020.01)
*B60W 10/20* (2006.01)
*B60W 30/12* (2020.01)

(52) U.S. Cl.
CPC .......... *B60W 30/165* (2013.01); *B60W 10/20* (2013.01); *B60W 30/12* (2013.01); *B60W 2554/4041* (2020.02); *B60W 2554/80* (2020.02); *B60W 2554/801* (2020.02)

(58) Field of Classification Search
CPC ...... B60W 10/20; B60W 30/10; B60W 30/12; B60W 30/165; B60W 2554/4041; B60W 2554/00; B60W 2554/80; B60W 2554/801; B60K 28/00–165; G05D 1/0061; G05D 1/0088; G05D 1/021; G05D 1/0214; G05D 1/0221; G05D 1/0223

See application file for complete search history.

(56) References Cited

U.S. PATENT DOCUMENTS 9,020,680 B2 * 4/2015 Solyom ................ B62D 15/026
                                                     701/23
2015/0100228 A1   4/2015 Sudou et al.
2020/0391796 A1 * 12/2020 Kojima ................ B62D 15/025

FOREIGN PATENT DOCUMENTS

JP          2015-71361 A          4/2015

* cited by examiner

*Primary Examiner* — Hung Q Nguyen
*Assistant Examiner* — Mark L. Greene
(74) *Attorney, Agent, or Firm* — TROUTMAN PEPPER LOCKE LLP (57) ABSTRACT

A traveling control apparatus includes at least one processor. The at least one processor is configured to function as a driving assistance controller. The driving assistance controller is configured to delay a change in a lateral position of a preceding vehicle traveling ahead of the vehicle to obtain a delay lateral position of the preceding vehicle, and provide steering control that causes the vehicle to track the preceding vehicle on a basis of the delayed lateral position of the preceding vehicle.

5 Claims, 5 Drawing Sheets

FIG. 7

TRAVELING CONTROL APPARATUS

CROSS-REFERENCE TO RELATED APPLICATION

The present application claims priority from Japanese Patent Application No. 2021-159667 filed on Sep. 29, 2021, the entire contents of which are hereby incorporated by reference.

BACKGROUND

The disclosure relates to a traveling control apparatus mounted on a vehicle.

Traveling control apparatuses have been proposed. For example, such a traveling control apparatus is configured to detect objects present ahead of a vehicle (first vehicle) having the traveling control apparatus thereon by using a radar, select from the detected objects a preceding vehicle to be tracked by the first vehicle, and perform traveling control which involves tracking the selected preceding vehicle (see, e.g., Japanese Unexamined Patent Application Publication No. 2015-71361).

SUMMARY

An aspect of the disclosure provides a traveling control apparatus that includes at least one processor. The at least one processor is configured to function as a driving assistance controller. The driving assistance controller is configured to delay a change in a lateral position of a preceding vehicle traveling ahead of the vehicle to obtain a delay lateral position of the preceding vehicle. The driving assistance controller is configured to provide steering control that causes the vehicle to track the preceding vehicle on a basis of the delayed lateral position of the preceding vehicle.

BRIEF DESCRIPTION OF THE DRAWINGS

The accompanying drawings are included to provide a further understanding of the disclosure and are incorporated in and constitute a part of this specification. The drawings illustrate an example embodiment and, together with the specification, serve to describe the principles of the disclosure.

DETAILED DESCRIPTION

For example, when the first vehicle having the traveling control apparatus thereon is traveling in a straight line while the preceding vehicle ahead of the first vehicle is traveling in a curve, the traveling control apparatus may turn the steering wheels at an early stage to allow the first vehicle to track the preceding vehicle. This may increase the amount of inward deflection, which is the amount of inward shift of the first vehicle in the curve.

Accordingly, it is desirable to reduce the amount of inward deflection during tracking of the preceding vehicle.

In the following, an embodiment of the disclosure is described in detail with reference to the accompanying drawings. Note that the following description is directed to an illustrative example of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiment which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

Figure 1:
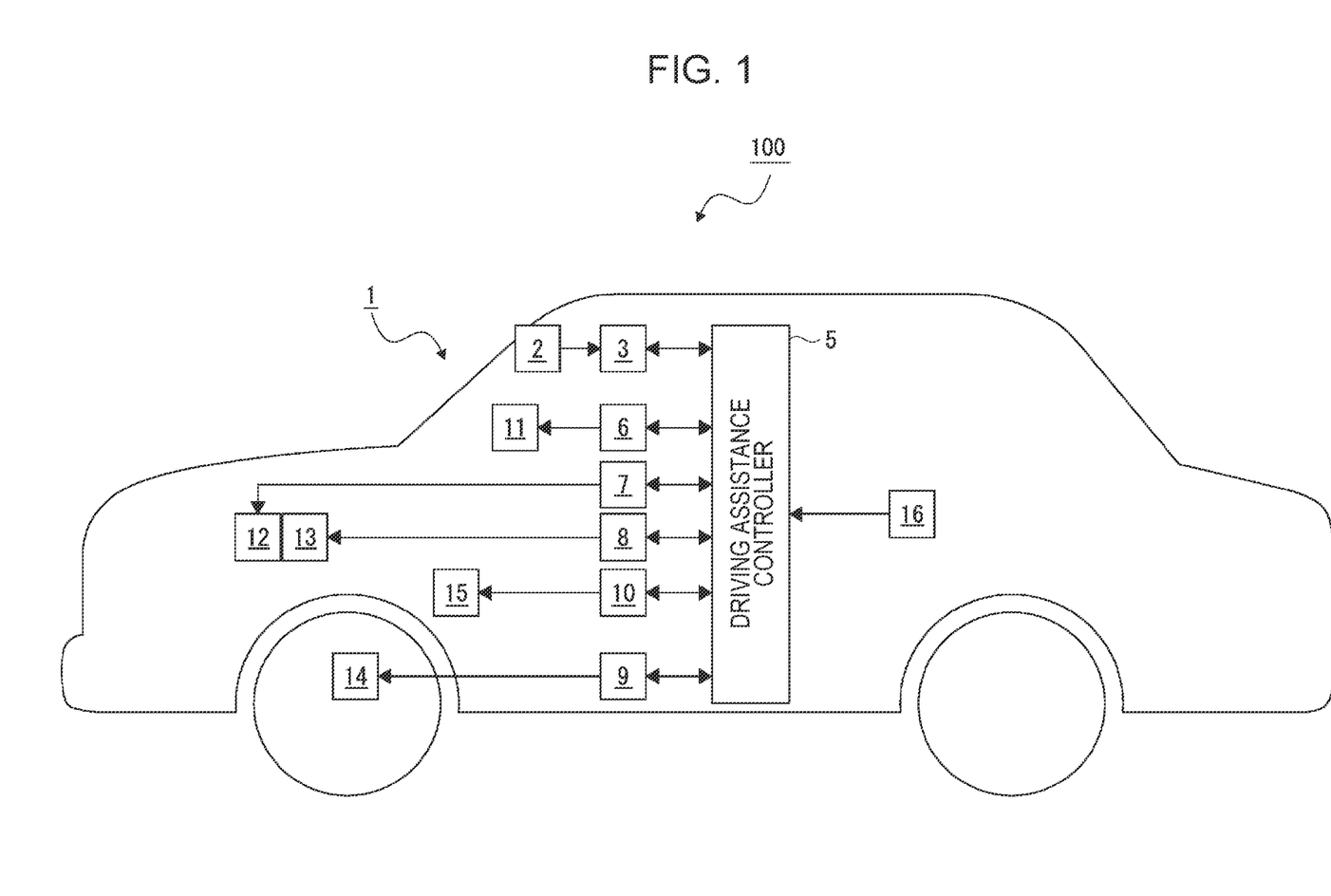
FIG. 1 is a diagram illustrating a vehicle equipped with a traveling control apparatus according to an embodiment of the disclosure.
Figure 2:
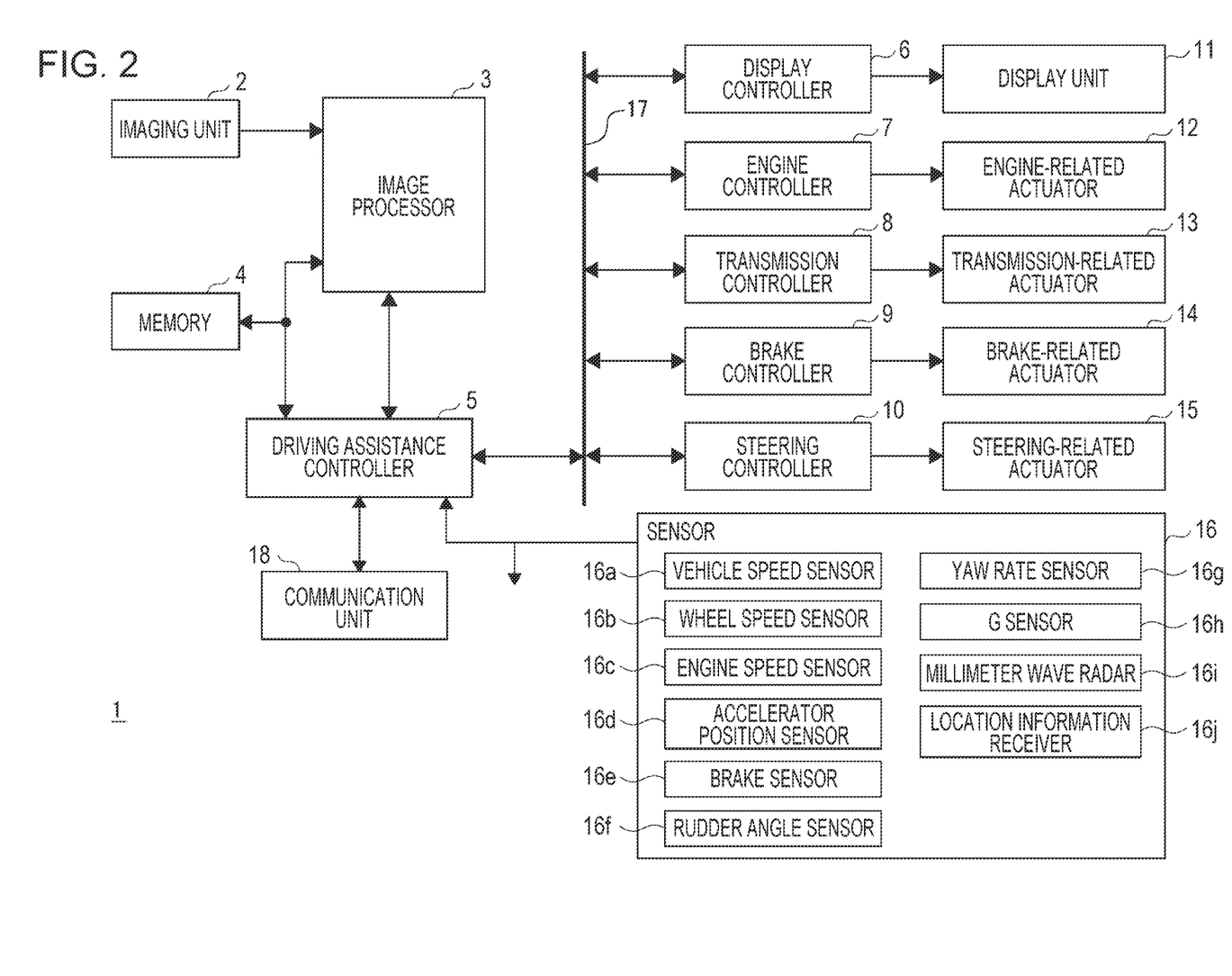
FIG. 2 is a diagram illustrating a configuration of the traveling control apparatus.

FIG. 1 is a diagram illustrating a vehicle 100 having a traveling control apparatus 1 mounted thereon. FIG. 2 is a diagram illustrating a configuration of the traveling control apparatus 1. As illustrated in FIG. 1, the traveling control apparatus 1 is mounted on the vehicle 100 and controls the traveling of the vehicle 100.

FIG. 1 illustrates a part of the traveling control apparatus 1, which actually includes other components as well.

As illustrated in FIG. 2, the traveling control apparatus 1 includes an imaging unit 2, an image processor 3, a memory 4, a driving assistance controller 5, a display controller 6, an engine controller 7, a transmission controller 8, a brake controller 9, a steering controller 10, a display unit 11, an engine-related actuator 12, a transmission-related actuator 13, a brake-related actuator 14, a steering-related actuator 15, a sensor 16, a bus 17, and a communication unit 18.

The driving assistance controller 5, the display controller 6, the engine controller 7, the transmission controller 8, the brake controller 9, and the steering controller 10 are coupled to each other via the bus 17.

The image processor 3 is constituted by a microcomputer that includes, for example, a central processing unit (CPU) (processor), a read-only memory (ROM), and a random-access memory (RAM). The image processor 3 executes predetermined image processing related to recognition of an environment outside the vehicle 100, on the basis of image data acquired from the imaging unit 2 which has captured an image of a region in the direction of travel of the vehicle 100 (ahead of the vehicle 100 in this example) and an image of a region lateral to the vehicle 100. The image processor 3 performs the image processing by using the memory 4 including, for example, a nonvolatile memory.

The imaging unit 2 is constituted, for example, by a stereo camera, which includes two cameras that are configured to capture images in substantially the same direction. The cameras each include a camera optical system and an imaging element, such as a charge-coupled device (CCD) or a complementary metal-oxide semiconductor (CMOS). The camera optical system forms a subject image on an imaging surface of the imaging element and generates an electric signal on a pixel-by-pixel basis in accordance with the amount of received light.

Each camera is installed in such a way as to be capable of measuring distances by a so-called stereo imaging technique. The electric signal generated by each camera is subjected to analog-to-digital (A/D) conversion and predetermined correction processing and supplied, to the image processor 3, as a digital image signal (image data) that represents a brightness value in a predetermined shade of gray on a pixel-by-pixel basis.

The imaging unit 2 may be constituted by a single camera including an imaging element that is capable of measuring distances. The imaging unit 2 may be constituted by a camera configured to capture an image of a region ahead of the vehicle 100, a camera configured to capture an image of a region behind the vehicle 100, and a camera configured to capture an image of a region lateral to the vehicle 100.

The image processor 3 executes various types of image processing based on image data acquired by stereo imaging, recognizes forward information, such as information about three-dimensional objects and traffic lines (e.g., center and lane lines) ahead of the vehicle 100, and recognizes the road and lane (vehicle travel path) in which the vehicle 100 is traveling on the basis of the recognized information. The image processor 3 also recognizes a preceding vehicle to be tracked on the basis of, for example, the recognized three-dimensional objects.

For example, the image processor 3 performs the following processing as processing that is based on image data obtained by stereo imaging. First, for a pair of images captured as image data, the image processor 3 generates distance information for each pixel from the amount of displacement (parallax) between the corresponding positions by using the principles of triangulation. The image processor 3 then performs a known grouping process on the distance information, and compares the resulting grouped distance information to, for example, three-dimensional road shape data and three-dimensional object data stored in advance, so as to recognize lane lines, guardrails and side walls, such as curbs, along the road, three-dimensional objects, such as vehicles, stop lines, traffic lights, railroad crossings, pedestrian crossings, and lanes.

If the overlapping ratio of a recognized vehicle located ahead is greater than or equal to a predetermined value, the image processor 3 recognizes the vehicle as a preceding vehicle. The overlapping ratio represents the degree to which the lateral position of the vehicle 100 overlaps the lateral position of the vehicle ahead of the vehicle 100. The overlapping ratio is 100% when the vehicle ahead of the vehicle 100 completely overlaps the vehicle 100, the overlapping ratio is 50% when half the lateral width of one vehicle body overlaps that of the other, and the overlapping ratio is 0% when the lateral width of one vehicle body does not overlap that of the other.

The image processor 3 can thus recognize a nearby object and its behavior on the basis of an image captured by the imaging unit 2. For example, the image processor 3 can recognize the position, speed, and acceleration (positive or negative acceleration depending on the increase or decrease in speed) of the preceding vehicle with respect to the vehicle 100, a change in the direction of travel of the preceding vehicle, and flashing of a direction indicator of the preceding vehicle.

For example, the image processor 3 recognizes various types of external environment information, such as those described above, for each frame of image data, and sequentially stores (retains) the recognized information in the memory 4.

The driving assistance controller 5 is constituted by a microcomputer that includes, for example, a CPU, a ROM, and a RAM. The driving assistance controller 5 executes various types of driving assistance control for driving assistance on the basis of, for example, a result of image processing performed by the image processor 3 and retained in the memory 4, a detection signal obtained by the sensor 16, operation input information, and communication information of the communication unit 18.

The driving assistance controller 5 is coupled via the bus 17 to the display controller 6, the engine controller 7, the transmission controller 8, the brake controller 9, and the steering controller 10 each also constituted by a microcomputer. The driving assistance controller 5 can perform data communication with each of the controllers described above. The driving assistance controller 5 appropriately instructs the controllers to execute a necessary operation related to driving assistance.

Examples of possible driving assistance control executed by the driving assistance controller 5 include lane keeping control, collision mitigation braking control (autonomous emergency braking (AEB)), inter-vehicle distance control (adaptive cruise control (ACC)), and steering control for tracking a preceding vehicle (hereinafter referred to as preceding-vehicle tracking steering control). Note that the description of lane keeping control, collision mitigation braking control, and inter-vehicle distance control, which can be performed by known techniques, is omitted. The preceding-vehicle tracking steering control will be described in detail later on below.

The display controller 6 controls a display operation of the display unit 11 on the basis of, for example, a detection signal from the sensor 16, operation input information from an operation unit, or an instruction from the driving assistance controller 5. For example, on the basis of an instruction from the driving assistance controller 5, the display controller 6 can display a predetermined alert message in the display unit 11 as part of the driving assistance.

The display unit 11 collectively refers to various meters, such as a speedometer and a tachometer, on a meter panel installed in front of the driver, a multifunction display (MFD), and a display device for providing information to the driver. The MFD is capable of displaying various types of information, such as the total traveling distance of the vehicle 100, outside air temperature, and instantaneous fuel economy, simultaneously or in a switching manner.

The engine controller 7 controls various actuators provided as the engine-related actuator 12, on the basis of, for example, a detection signal from the sensor 16, operation input information from the operation unit, or an instruction from the driving assistance controller 5.

As the engine-related actuator 12, various actuators related to engine drive, such as a throttle actuator for driving a throttle valve and an injector that performs fuel injection, are provided.

For example, the engine controller 7 performs control to start and stop the engine in response to the operation of an ignition switch. Also, the engine controller 7 controls, for example, fuel injection timing, fuel injection pulse width, and throttle position on the basis of a detection signal from a predetermined sensor, such as an engine speed sensor 16c or an accelerator position sensor 16d (described below).

Also, on the basis of a necessary torque calculated by the driving assistance controller 5 on the basis of a target acceleration and output, as well as the transmission gear ratio of the transmission, the engine controller 7 determines a target throttle position from, for example, a map and controls the throttle actuator (i.e., performs engine output control) on the basis of the determined throttle position.

The transmission controller 8 controls various actuators provided as the transmission-related actuator 13 on the basis of, for example, a detection signal from the sensor 16, operation input information from the operation unit, or an instruction from the driving assistance controller 5.

As the transmission-related actuator 13, for example, an actuator for variable-speed control of an automatic transmission is provided.

For example, the transmission controller 8 outputs a predetermined variable-speed signal to the transmission-related actuator 13 to perform variable-speed control.

When the automatic transmission is a continuously variable transmission (CVT), the variable-speed control involves continuously changing the transmission gear ratio.

The brake controller 9 controls various actuators provided as the brake-related actuator 14 on the basis of, for example, a detection signal from the sensor 16, operation input information from the operation unit, or an instruction from the driving assistance controller 5.

As the brake-related actuator 14, various brake-related actuators, such as hydraulic control actuators for controlling the hydraulic pressure output from a brake booster to a master cylinder and the hydraulic pressure in a brake fluid pipe, are provided.

For example, on the basis of hydraulic pressure instruction information output from the driving assistance controller 5, the brake controller 9 controls a hydraulic control actuator to apply brakes to the vehicle 100. The brake controller 9 calculates the slip ratio of wheels on the basis of a detection signal from a predetermined sensor (e.g., rotation speed sensor on the axle or a vehicle speed sensor 16*a*), and causes the hydraulic control actuator to increase or decrease the hydraulic pressure in accordance with the slip ratio to achieve so-called antilock brake system (ABS) control.

The steering controller 10 controls various actuators provided as the steering-related actuator 15, on the basis of a detection signal from the sensor 16, operation input information from the operation unit, or an instruction from the driving assistance controller 5.

As the steering-related actuator 15, for example, an actuator for turning the steering wheels, such as front wheels, is provided.

For example, the steering controller 10 turns the steering wheels by controlling the steering-related actuator 15 on the basis of a steering angle detected by a rudder angle sensor 16*f* (described below). The steering controller 10 achieves automatic steering by controlling the steering-related actuator 15 on the basis of instruction information received from the driving assistance controller 5.

The sensor 16 collectively refers to various sensors mounted on the vehicle 100. Examples of the sensor 16 include, but are not limited to, the vehicle speed sensor 16*a*, a wheel speed sensor 16*b*, the engine speed sensor 16*c*, the accelerator position sensor 16*d*, a brake sensor 16*e*, the rudder angle sensor 16*f*, a yaw rate sensor 16*g*, a G sensor (acceleration sensor) 16*h*, a millimeter wave radar 16*i*, and a location information receiver 16*j*.

The vehicle speed sensor 16*a* detects the speed of the vehicle 100.

The wheel speed sensor 16*b* detects the rotation speed of the wheels.

The engine speed sensor 16*c* detects the engine speed.

The accelerator position sensor 16*d* detects the accelerator position from the degree of depression of the accelerator pedal.

The brake sensor 16*e* detects the amount of brake operation from the degree of depression of the brake pedal.

The rudder angle sensor 16*f* detects the steering angle of the steering wheel.

The yaw rate sensor 16*g* detects a yaw rate applied to the vehicle 100.

The G sensor 16*h* detects the direction of travel of the vehicle 100, the vehicle width direction, and acceleration acting in the vertical direction.

The millimeter wave radar 16*i* detects surrounding conditions by means of sensing through outward emission of millimeter waves.

The location information receiver 16*j* is, for example, a global navigation satellite system (GNSS) receiver or a receiver that receives information from a roadside unit, and acquires current location information.

Various detection signals from the sensor 16 are appropriately supplied to the image processor 3, the driving assistance controller 5, the display controller 6, the engine controller 7, the transmission controller 8, the brake controller 9, and the steering controller 10.

The communication unit 18 performs inter-vehicle communication and network communication. The driving assistance controller 5 can acquire information about another vehicle received by the communication unit 18. The communication unit 18 can also acquire various types of information, such as surrounding environment information and road information of the current location, through network communication, such as the Internet.

Preceding-vehicle tracking steering control according to an embodiment will be described.

Hereinafter, a vehicle travelling ahead of the vehicle 100, which has the traveling control apparatus 1 mounted thereon, will be referred to as a preceding vehicle 200.

If lane keeping control cannot be performed because the image processor 3 fails to identify the lane in which the vehicle 100 is traveling during execution of ACC, the driving assistance controller 5 performs preceding-vehicle tracking steering control instead of lane keeping control. Execution of preceding-vehicle tracking steering control may take place when ACC is not being executed, or may be prioritized over lane keeping control during execution of ACC.

Preceding-vehicle tracking steering control according to a comparative example will be described first, and this will be followed by description of the process of preceding-vehicle tracking steering control according to the embodiment. In the comparative example and the embodiment, the preceding-vehicle tracking steering control is executed every time the imaging unit 2 captures an image and the image processor 3 performs image processing. The execution takes place at intervals of processing time t. That is, preceding-vehicle tracking steering control is executed every processing time t.

Figure 3:
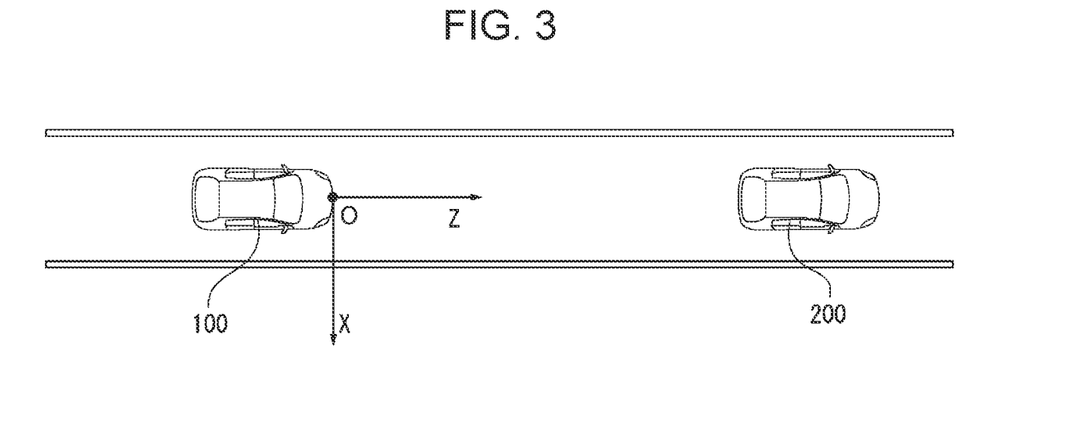
FIG. 3 is a diagram illustrating an overview of preceding-vehicle tracking steering control.
Figure 4:
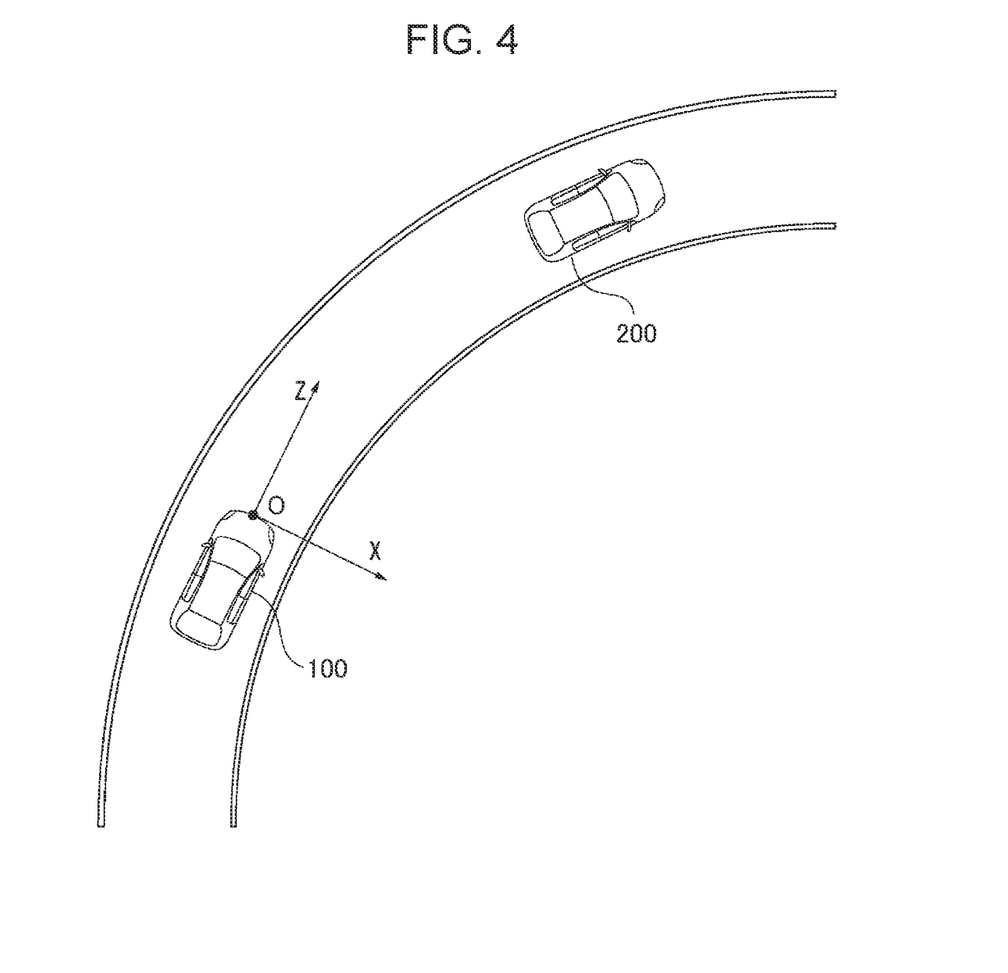
FIG. 4 is a diagram illustrating an overview of preceding-vehicle tracking steering control.

FIG. 3 and FIG. 4 are diagrams each illustrating an overview of preceding-vehicle tracking steering control. FIG. 3 illustrates an example where the vehicle 100 and the preceding vehicle 200 are traveling in a straight line. FIG. 4 illustrates an example where the vehicle 100 and the preceding vehicle 200 are traveling in a curve with a constant radius of curvature.

As illustrated in FIG. 3 and FIG. 4, the driving assistance controller 5 acquires information representing the position (X, Z) of the preceding vehicle 200 in the XZ coordinate system, with respect to the origin O, and retained in the memory 4 as a result of image processing performed by the image processor 3. The origin O, described above, is a predetermined position of the vehicle 100.

For example, the origin O is set at the center of the vehicle 100 in the lateral direction (right and left direction) and at the leading end of the vehicle 100 in the direction of travel. In the XZ coordinate system, the X-axis direction is along the lateral direction of the vehicle 100, where the rightward direction is considered positive, and the Z-axis direction is along the forward and rearward direction of the vehicle 100, where the forward direction is considered positive.

The driving assistance controller 5 sets the acquired position of the preceding vehicle 200 as a control $$k = \frac{2X}{X^2 + Z^2} \quad (1)$$

target point and calculates a curvature k using equation (1).

The driving assistance controller 5 instructs the steering controller 10 to cause the vehicle 100 to travel in a curve with the calculated curvature k. That is, the driving assistance controller 5 causes the steering controller 10 to perform steering control which drives the steering-related actuator 15 in such a way that the vehicle 100 travels in a curve with the calculated curvature k.

When the vehicle 100 and the preceding vehicle 200 are traveling in a straight line as illustrated in FIG. 3, the curvature k in equation (1) is substantially zero. Accordingly, the driving assistance controller 5 causes steering control to be performed in such a way that the vehicle 100 travels substantially in a straight line. This enables the vehicle 100 to track the preceding vehicle 200 while traveling in a straight line.

When the vehicle 100 and the preceding vehicle 200 are traveling in a curve with a constant radius of curvature as illustrated in FIG. 4, the driving assistance controller 5 causes steering control to be performed in such a way that the vehicle 100 travels in a curve with the curvature k, which is the reciprocal of the constant radius of curvature. This enables the vehicle 100 to track the preceding vehicle 200 while traveling in a curve with a constant radius of curvature.

Figure 5:
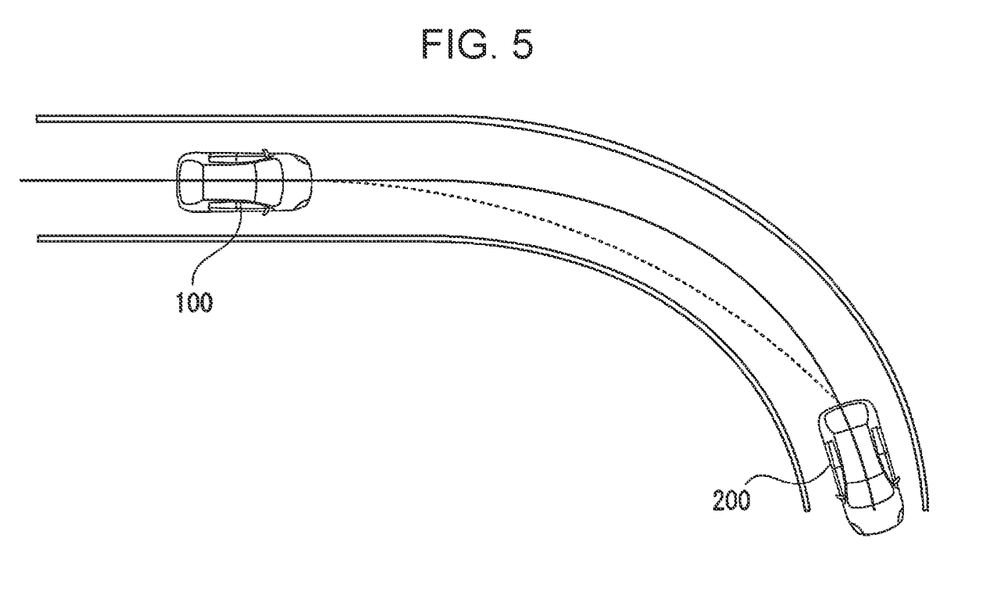
FIG. 5 is a diagram illustrating preceding-vehicle tracking steering control performed when a preceding vehicle is traveling in a curve.

FIG. 5 is a diagram illustrating preceding-vehicle tracking steering control performed when the preceding vehicle 200 is traveling in a curve.

Assume that the preceding vehicle 200 is traveling in a curve and the vehicle 100 is traveling in a straight line as illustrated in FIG. 5.

In this case, the curvature k is calculated on the basis of equation (1) and steering control is performed in such a way that the vehicle 100 travels in a curve with the calculated curvature k. Since the preceding vehicle 200 is shifted in the lateral direction (X-axis direction), the curvature k in equation (1) is large.

As a result, the vehicle 100 is steered toward the preceding vehicle 200 at an early stage and takes a shorter route than the road, as indicated by a broken line in FIG. 5. In other words, the vehicle 100 takes a path inside that of the preceding vehicle 200.

Accordingly, the preceding-vehicle tracking steering control according to the embodiment delays a change in the lateral position of the preceding vehicle 200, and causes steering control of the vehicle 100 to be performed in such a way as to track the preceding vehicle 200 on the basis of the delayed position.

Figure 6:
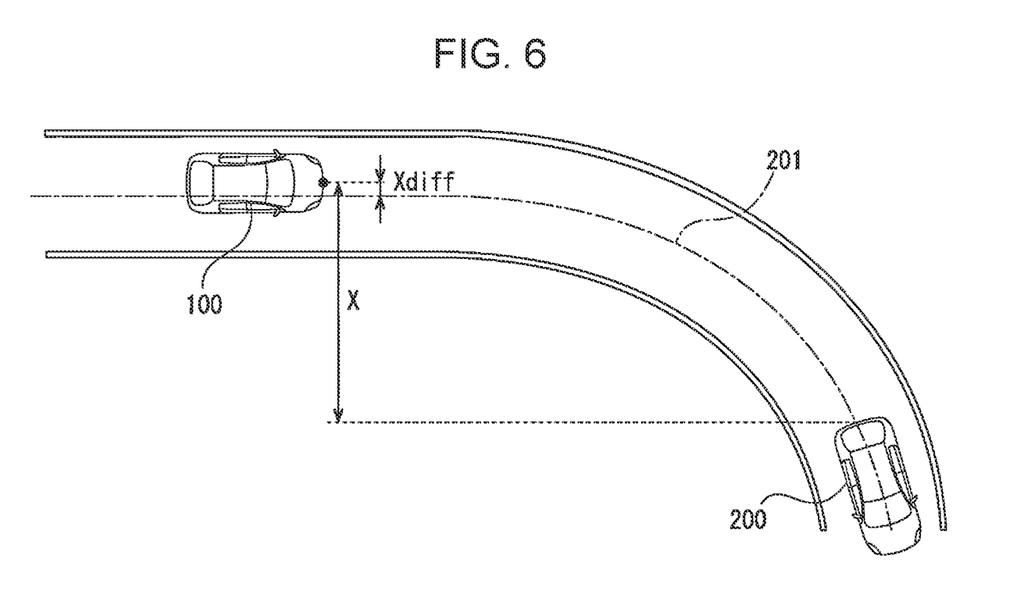
FIG. 6 is a diagram illustrating preceding-vehicle tracking steering control according to an embodiment.

FIG. 6 is a diagram illustrating preceding-vehicle tracking steering control according to the embodiment. For example, the driving assistance controller 5 acquires, from the memory 4, information representing the position (X, Z) of the preceding vehicle 200 as illustrated in FIG. 6, and calculates, as a traveling path 201 of the preceding vehicle 200, an approximate curve by the method of least squares, using the previously acquired position (X,Z) of the preceding vehicle 200 and the position (X,Z) of the preceding vehicle 200 acquired this time. The approximate curve may have any number of dimensions.

The driving assistance controller 5 also calculates a deviation Xdiff of the vehicle 100 in the X-axis direction with respect to the traveling path 201. The deviation Xdiff is a value that represents to what degree the vehicle 100 is shifted from the traveling path 201 of the preceding vehicle 200 in the lateral direction. That is, the deviation Xdiff indicates the amount of displacement of the vehicle 100 from the traveling path 201 in the X-axis direction.

The driving assistance controller 5 performs first-order differentiation of the position of the preceding vehicle 200 in the X-axis direction acquired this time, to calculate a relative lateral shift X'_TGT of the preceding vehicle 200.

The driving assistance controller 5 also performs first-order differentiation of the deviation Xdiff to calculate a lateral shift X'_OWN of the vehicle 100 from the preceding vehicle 200.

The lateral shift X'_TGT is the amount of relative change of the preceding vehicle 200 from the vehicle 100 in the lateral direction. That is, the lateral shift X'_TGT is a value that also changes when the vehicle 100 is shifted in the lateral direction. Therefore, the driving assistance controller 5 subtracts, from the lateral shift X'_TGT, the lateral shift X'_OWN, which is the amount of lateral shift of the vehicle 100 from the traveling path 201, to calculate the lateral shift of the preceding vehicle 200 (X'_TGT-X'_OWN).

Then, by using equation (2) described below, the driving assistance controller 5 calculates a corrected lateral position X_COR obtained by delaying a change in the lateral position of the preceding vehicle 200.

$$X\_COR = X - (X'\_TGT - X'\_OWN) \quad (2)$$

The corrected lateral position X_COR is a value calculated by subtracting the lateral shift of the preceding vehicle 200 (X'_TGT -X'_OWN) from the position of the preceding vehicle 200 in the X-axis direction acquired this time.

The driving assistance controller 5 then calculates the curvature k by substituting the corrected lateral position X_COR into X in equation (1). The driving assistance controller 5 causes the steering controller 10 to perform steering control that drives the steering-related actuator 15 in such a way that the vehicle 100 travels in a curve with the calculated curvature k.

When the preceding vehicle 200 begins to turn from a straight traveling state, a change in lateral position is delayed on the basis of a speed in the lateral direction. Thus, when the preceding vehicle 200 begins to turn from a straight traveling state, the amount of lateral shift of the vehicle 100 can be reduced.

Therefore, as indicated by a solid line in FIG. 5, a shift toward the inside of the lane can be made smaller than that in the case of the path represented by the broken line.

When the vehicle 100 and the preceding vehicle 200 are traveling in a straight line as illustrated in FIG. 3, the position of the preceding vehicle 200 in the X direction does not change. This means that calculating the corrected lateral position X_COR and substituting it into equation (1) has little impact.

When the vehicle 100 and the preceding vehicle 200 are traveling in a curve with a constant radius of curvature as illustrated in FIG. 4, a relative positional relation of the vehicle 100 and the preceding vehicle 200 does not change. That is, values obtained by first-order differentiation of the lateral position X and the deviation Xdiff are virtually zero. This means that calculating the corrected lateral position X_COR and substituting it into equation (1) has little impact.

Figure 7:
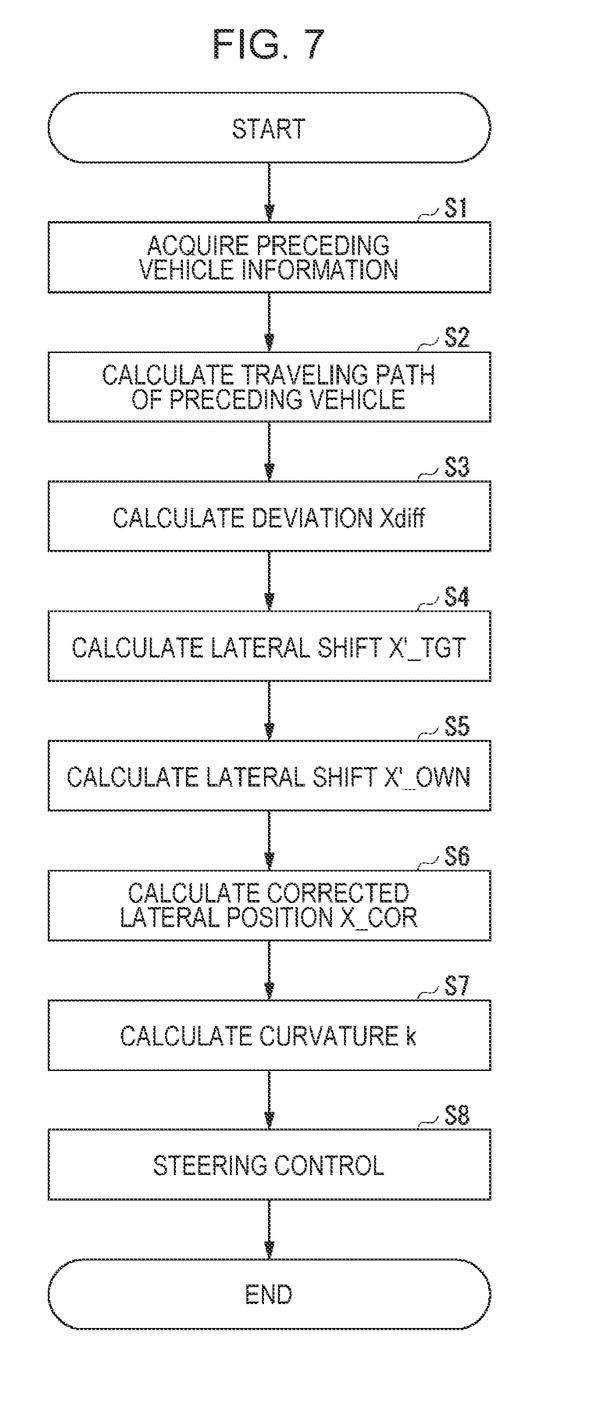
FIG. 7 is a flowchart illustrating a process of preceding-vehicle tracking steering control according to the embodiment.

FIG. 7 is a flowchart illustrating a process of preceding-vehicle tracking steering control according to the embodiment. When the preceding-vehicle tracking steering control starts, as illustrated in FIG. 7, the driving assistance controller 5 acquires information (preceding vehicle information) representing the position (X,Z) of the preceding vehicle 200 from the memory 4 in step S1. In step S2, the driving assistance controller 5 calculates the traveling path 201 of the preceding vehicle 200 by the method of least squares, using the previously acquired position (X,Z) of the preceding vehicle 200 and the position (X,Z) of the preceding vehicle 200 acquired this time.

Then, the driving assistance controller 5 calculates the lateral deviation Xdiff of the vehicle 100 in step S3, calculates the relative lateral shift X' TGT of the preceding vehicle 200 in step S4, and calculates the lateral shift X' OWN from the traveling path 201 in step S5.

In step S6, the driving assistance controller 5 calculates the corrected lateral position X_COR by using equation (2).

In step S7, the driving assistance controller 5 calculates the curvature k by substituting the corrected lateral position X_COR into X in equation (1). In step S8, the driving assistance controller 5 causes steering control to be performed in such a way that the vehicle 100 travels in a curve with the curvature k. The driving assistance controller 5 then ends the process.

The embodiments described above are examples for carrying out the disclosure. Embodiments of the disclosure are not limited to the examples described above, and various modifications are possible.

For example, in the preceding-vehicle tracking steering control of the embodiment described above, the corrected lateral position X_COR is calculated to delay a change in the lateral position of the preceding vehicle 200. However, a change in the lateral position of the preceding vehicle 200 may be delayed in other ways and the technique is not limited to this.

A program that causes a computer to execute the process illustrated in FIG. 7 can be stored in a storage medium, such as a nonvolatile memory in the driving assistance controller 5 or a nonvolatile memory in the traveling control apparatus 1. The program may be stored in a portable storage medium, or may be downloaded from a server through a network communication onto the vehicle 100.

Although the image processor 3, the driving assistance controller 5, the display controller 6, the engine controller 7, the transmission controller 8, the brake controller 9, and the steering controller 10 described above are constituted by different microcomputers, they may be constituted by a single microcomputer. Some of the image processor 3, the driving assistance controller 5, the display controller 6, the engine controller 7, the transmission controller 8, the brake controller 9, and the steering controller 10 may be constituted by a single microcomputer.

As described above, the traveling control apparatus 1 according to the embodiments includes at least one processor. The processor includes the driving assistance controller 5 configured to delay a change in the lateral position of the preceding vehicle 200 and provide steering control that enables the vehicle 100 to track the preceding vehicle 200 on the basis of the delayed lateral position of the preceding vehicle 200 (corrected lateral position X_COR).

The traveling control apparatus 1 can thus delay the steering (phase) of the vehicle 100 with respect to the lateral position of the preceding vehicle 200. For example, the traveling control apparatus 1 can delay the steering of the vehicle 100 when the preceding vehicle 200 is approaching a curve while the vehicle 100 is still traveling in a straight line.

The traveling control apparatus 1 can thus reduce the amount of inward deflection of the vehicle 100 which is tracking the preceding vehicle 200.

The traveling control apparatus 1 can begin to turn the vehicle 100 when the vehicle 100 gets closer to the timing when the preceding vehicle 200 has begun to turn. This can provide steering assistance of a natural feel.

The driving assistance controller 5 may be configured to delay a change in the lateral position of the preceding vehicle 200 on the basis of the lateral position of the preceding vehicle 200 with respect to the vehicle 100 and the amount of lateral shift of the preceding vehicle 200.

A change in the lateral position of the preceding vehicle 200 can thus be delayed with a simple technique.

The driving assistance controller 5 may be configured to calculate the amount of lateral shift of the preceding vehicle 200 on the basis of the differential value of the lateral position X of the preceding vehicle 200 (lateral shift X'_TGT) with respect to the vehicle 100 and the differential value of the lateral deviation Xdiff of the vehicle 100 (lateral shift X'_OWN) with respect to the traveling path 201 of the preceding vehicle 200.

This can reduce the impact of lateral shift of the vehicle 100 and make it possible to calculate the amount of lateral shift of the preceding vehicle 200 with accuracy.

For example, the steering control may be performed in such a way as to track the traveling path 201 of the preceding vehicle 200. However, this steering control involves moving the point sequence of the position (X,Z) of the preceding vehicle 200 as the vehicle 100 moves, and may lead to an increased error depending on the accuracy of, for example, a gyroscope sensor. With the technique described above, the driving assistance controller 5 enables the vehicle 100 to track the preceding vehicle 200 with accuracy.

The driving assistance controller 5 may be configured to calculate the delayed lateral position of the preceding vehicle 200 by subtracting the amount of lateral shift of the preceding vehicle 200 from the lateral position of the preceding vehicle 200 with respect to the vehicle 100.

This can reduce the impact of lateral shift of the vehicle 100 and delay the lateral position of the preceding vehicle 200 with accuracy.

The driving assistance controller 5 may be configured to calculate the curvature k on the basis of the delayed lateral position of the preceding vehicle 200, and cause steering control to be performed in such a way that the vehicle 100 travels in a curve with the calculated curvature k.

The traveling control apparatus 1 can thus reduce the amount of inward deflection of the vehicle 100 which is tracking the preceding vehicle 200.

The invention claimed is:

1. A traveling control apparatus to be mounted on a vehicle, the traveling control apparatus comprising at least one processor, wherein
the at least one processor is configured to function as a driving assistance controller, and
the driving assistance controller is configured to:
delay a change in a lateral position of a preceding vehicle ahead of the vehicle to obtain a delayed lateral position of the preceding vehicle, wherein the driving assistance controller is configured to delay the change in the lateral position of the preceding vehicle on a basis of the lateral position of the preceding vehicle with respect to the vehicle and an amount of lateral shift of the preceding vehicle,
calculate the amount of the lateral shift of the preceding vehicle on a basis of a differential value of the lateral position of the preceding vehicle with respect to the vehicle and a differential value of a lateral deviation of the vehicle with respect to a traveling path of the preceding vehicle, and
provide steering control that causes the vehicle to track the preceding vehicle on a basis of the delayed lateral position of the preceding vehicle.

2. The traveling control apparatus according to claim 1, wherein the driving assistance controller is configured to calculate the delayed lateral position of the preceding vehicle by subtracting the amount of lateral shift of the preceding vehicle from the lateral position of the preceding vehicle with respect to the vehicle.

3. The traveling control apparatus according to claim 1, wherein the driving assistance controller is configured to calculate a curvature on a basis of the delayed lateral position of the preceding vehicle, and cause the steering control to be performed in such a way that the vehicle travels with the calculated curvature.

4. A traveling control apparatus to be mounted on a vehicle, the traveling control apparatus comprising at least one processor, wherein
the at least one processor is configured to function as a driving assistance controller configured to:
delay a change in a lateral position of a preceding vehicle ahead of the vehicle to obtain a delayed lateral position of the preceding vehicle, wherein the driving assistance controller is configured to delay the change in the lateral position of the preceding vehicle on a basis of (i) the lateral position of the preceding vehicle with respect to the vehicle and (ii) an amount of lateral shift of the preceding vehicle, wherein the amount of lateral shift of the preceding vehicle is the amount of relative change, in a lateral direction, of the lateral position of the preceding vehicle and the lateral position of the vehicle, and
provide steering control that causes the vehicle to track the preceding vehicle on a basis of the delayed lateral position of the preceding vehicle.

5. A traveling control apparatus to be mounted on a vehicle, the traveling control apparatus comprising at least one processor, wherein
the at least one processor is configured to function as a driving assistance controller configured to:
delay a change in a lateral position of a preceding vehicle ahead of the vehicle to obtain a delayed lateral position of the preceding vehicle, wherein the driving assistance controller is configured to obtain the delayed lateral position of the preceding vehicle by subtracting an amount of lateral shift of the preceding vehicle from the lateral position of the preceding vehicle with respect to the vehicle, wherein the amount of lateral shift of the preceding vehicle is the amount of relative change, in a lateral direction, of the lateral position of the preceding vehicle and the lateral position of the vehicle, and
provide steering control that causes the vehicle to track the preceding vehicle on a basis of the delayed lateral position of the preceding vehicle.

* * * * *